United States Patent [19]
Henderson et al.

[11] Patent Number: 5,743,599
[45] Date of Patent: Apr. 28, 1998

[54] ELECTROMAGNETIC RETARDER CONTROL APPARATUS AND METHOD

[75] Inventors: Robert Henderson; Scott Kimbrough; Lawrence Smiltneek, all of Salt Lake City, Utah

[73] Assignee: K-Tronics, Inc., Salt Lake City, Utah

[21] Appl. No.: 629,394

[22] Filed: Apr. 8, 1996

[51] Int. Cl.⁶ .................................................. B60T 13/66
[52] U.S. Cl. ........................ 303/20; 303/152; 318/362
[58] Field of Search ........................... 303/3, 7, 15, 20, 303/161, 199, 152; 318/140, 362, 363

[56] References Cited

U.S. PATENT DOCUMENTS 4,990,844  2/1991  Gritter et al. .................. 318/362 X

OTHER PUBLICATIONS

Brochure—Austria Retarder Bau Ges.m.b.H. "Technical description ARB–Retarder type C".

Primary Examiner—Lee W. Young
Assistant Examiner—Pamela J. Lipka
Attorney, Agent, or Firm—Thorpe, North & Western, LLP

[57] ABSTRACT

A controller for controlling supply of electrical current to the coils or coil groups of an electromagnetic retarder for applying drag torque to a turning shaft or drive line. The controller includes an input signal receiving element for receiving input signals from at least one input device, a control unit responsive to the input signal for modulating electrical current supply from at least one current source to the retarder coils so that current is distributed to each of the coils or coil groups substantially equally.

21 Claims, 7 Drawing Sheets

ELECTROMAGNETIC RETARDER CONTROL APPARATUS AND METHOD

BACKGROUND OF THE INVENTION

1. The Field of the Invention

The present invention pertains generally to the field of braking systems and more particularly to controllers of braking system electromagnetic retarders.

2. The Background Art

Electromagnetic retarders are devices used in braking systems to slow the speed of a turning shaft, drive line or similar turning apparatus. Retarders do not depend upon friction to generate braking forces; rather, they produce a drag torque by producing an electromagnetic force opposing the turning shaft or drive line. The electromagnetic force that produces the drag torque arises from passing an electrical current through coils which reside within the retarder. The amount of force provided by the retarder increases as the amount of current passing through the coils increases.

Because retarders do not depend upon friction to generate braking forces, they do not wear out as quickly as friction brakes. Thus, retarders can reduce vehicle operating costs by reducing the frequency of brake repairs.

The flow of current through the coils of retarders is controlled by using heavy-duty relays called contactors—contactors have two states, open or closed. When a contactor is open, no current passes through the corresponding coils, and when closed, electrical current passes to the corresponding coils. Contactors have been preferred in the past because they have low electrical resistance when closed, and this reduces parasitic energy loss, especially since retarder coils have low resistance and draw high current levels.

In vehicles, it is desirable to have graduated braking force so that the occupants and load are not subjected to sudden or excessive deceleration. Contactors only provide two levels of current, namely no-current and maximum current. To provide some graduation of braking force, retarders were constructed with groups of retarder coils, typically four, with each group being controlled by an individual contactor. Different levels of braking force could then be achieved by successively closing contactors, thus turning on successive groups of coils. The braking force was increased by turning on one group, then two groups, then three groups, etc.

The successive activation of the groups of coils presents a number of problems, particularly due to the differing amounts of wear to which the coil groups are subjected. The first group of coils is turned on and off most often and thus suffers the most wear due to temperature cycling and heating. While the first group of coils is overused, the fourth group is underused because it is least often turned on, and yet it is still designed to withstand the same stresses as the first group, i.e., it is "overdesigned".

Additionally, the contactors allow for only discrete, incremental, increases in force. The number of increments of force available is limited to the number of coil groups, with only one increment of force available for each coil group employed.

OBJECTS AND SUMMARY OF THE INVENTION

It is an object of the invention to provide a reliable, durable and economical controller for electromagnetic retarders.

It is another object of the invention to provide a retarder control that extends the working life of retarders by equally distributing work and wear among retarder coil groups.

It is a further object of the invention to provide a retarder control capable of gradually increasing and decreasing retarder braking force.

It is another object of the invention to provide a retarder control that is lightweight and easy to install.

It is also an object of the invention to provide a retarder control that efficiently dissipates heat.

The above objects and others not specifically recited are realized in a specific illustrative embodiment of an electromagnetic retarder control system which controls the supply of electrical current from a current source to a plurality of coil groups of an electromagnetic retarder, for applying drag torque to a turning shaft or drive line. The control system includes a plurality of switch circuits, each coupled between the current source and respective one of the coil groups, for passing current from the current source to a respective coil group when energized and for blocking passage of current from the current source when de-energized. Also included is a control unit for selectively energizing and de-energizing each switch circuit to allow substantially the same amount of current to flow to each coil group.

In accordance with one aspect of the invention, the controller operates to de-energize one coil group at the same time as another coil group is energized, thereby minimizing voltage spikes which might otherwise be produced when current from the current source to a coil group is abruptly cut off.

In accordance with another aspect of the invention, the controller operates to energize and de-energize the switches so that the number of coil groups receiving current from the current source at any instant of time remain substantially constant.

BRIEF DESCRIPTION OF THE DRAWINGS

The objects and features of the invention will become apparent from a consideration of the following detailed to description presented in connection with the accompanying drawings, in which.

DETAILED DESCRIPTION

Figure 1:
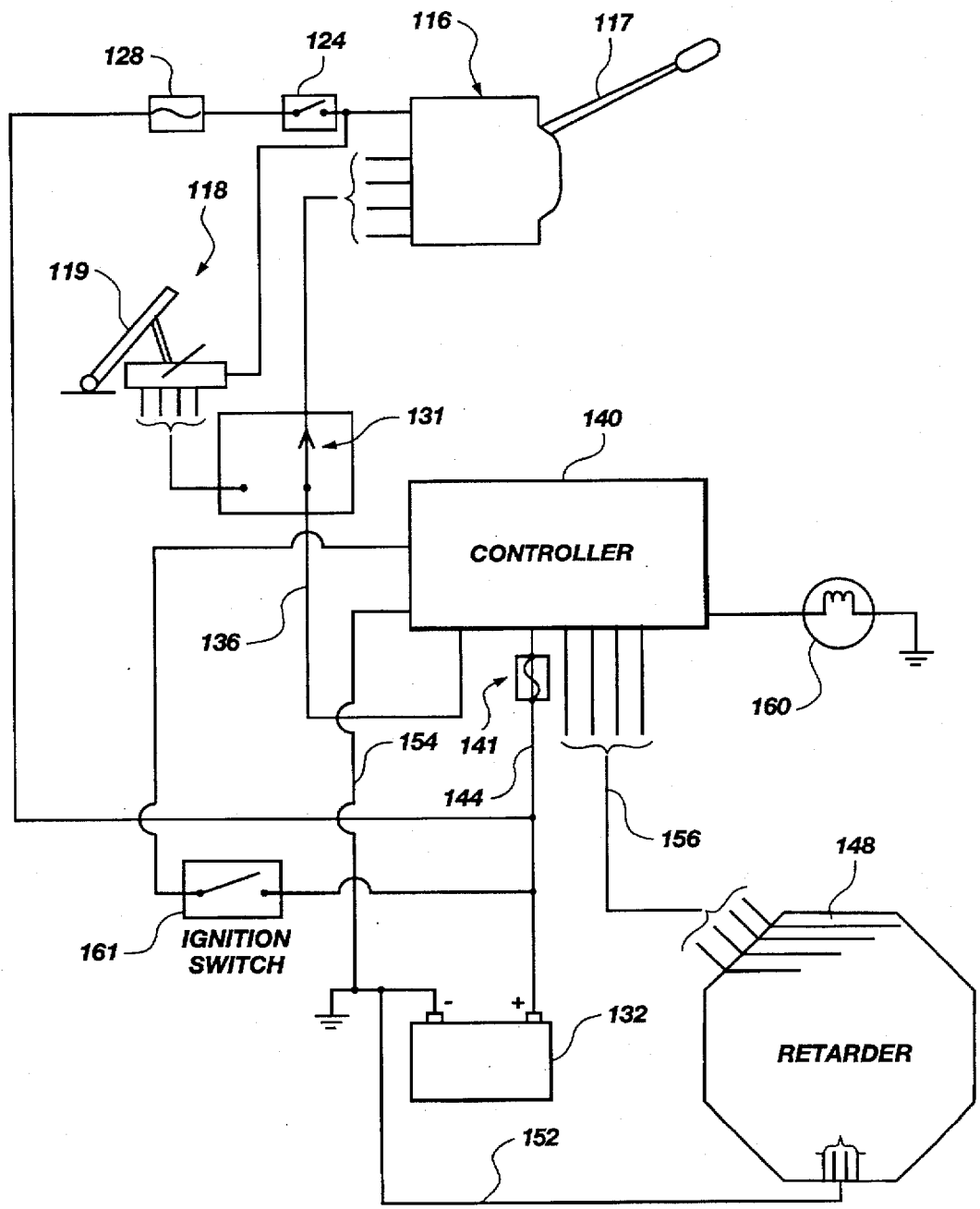
FIG. 1 is a schematic view of electromagnetic retarder control apparatus made in accordance with the principles of the present invention.

Referring to FIG. 1, there is shown an illustrative embodiment of a controller for electromagnetic retarders made in accordance with the present invention, as such apparatus might be installed in a vehicle. A user of the vehicle manually determines the amount of electromagnetic retardation or braking force which is to be applied to the vehicle either by a hand control 116 or a foot control 118, with the amount of braking force to be developed being determined by the amount of movement of a handle 117 of the hand control or the movement of a foot pedal 119 of the foot control. The hand control 116 and foot control 118 are conventional devices already used in vehicles for controlling electromagnetic retarders. Both the hand control 116 and foot control 118 could be used simultaneously by joining their outputs via a summing amplifier to the controller 140.

The hand control 116 and foot control 118 are both coupled via a switch 124 and fuse 128 to a current source 132, shown as being a conventional battery. The fuse 128 simply provides protection for the hand control 116 and foot control 118 against short circuits, and the switch 124 allows for manually disconnecting both the hand control and foot control from the current source 132.

The hand control 116 or foot control 118 are also connected through a switch 131 and via a plurality of command lines or conductors 136 to an electromagnetic retarder controller 140. The current source or battery 132 provides power to the controller 140 through the ignition switch 161 and also current through a high current fuse 141 (which protects against short circuits) which will be directed by the controller to an electromagnetic retarder 148. A return lead 152 couples the retarder 148 to the negative and ground terminal of the battery 132, and a return lead 154 connects the ground terminal of the battery to the controller 140.

Also coupled to the controller 140 is one or more stop lights 160 which, when the retarder 148 is being activated by the controller, is lighted to indicate that the vehicle is braking (just as is done in all conventional motor vehicles).

When either the hand control 116 or the foot control 118 is operated, a command signal is generated by the respective control and supplied via command lines 136 to the controller 140. In response, the controller 140 supplies modulated current via leads 156 to the electromagnetic retarder 148 to selectively activate electromagnetic coils for developing a braking force for the vehicle.

Figure 2:
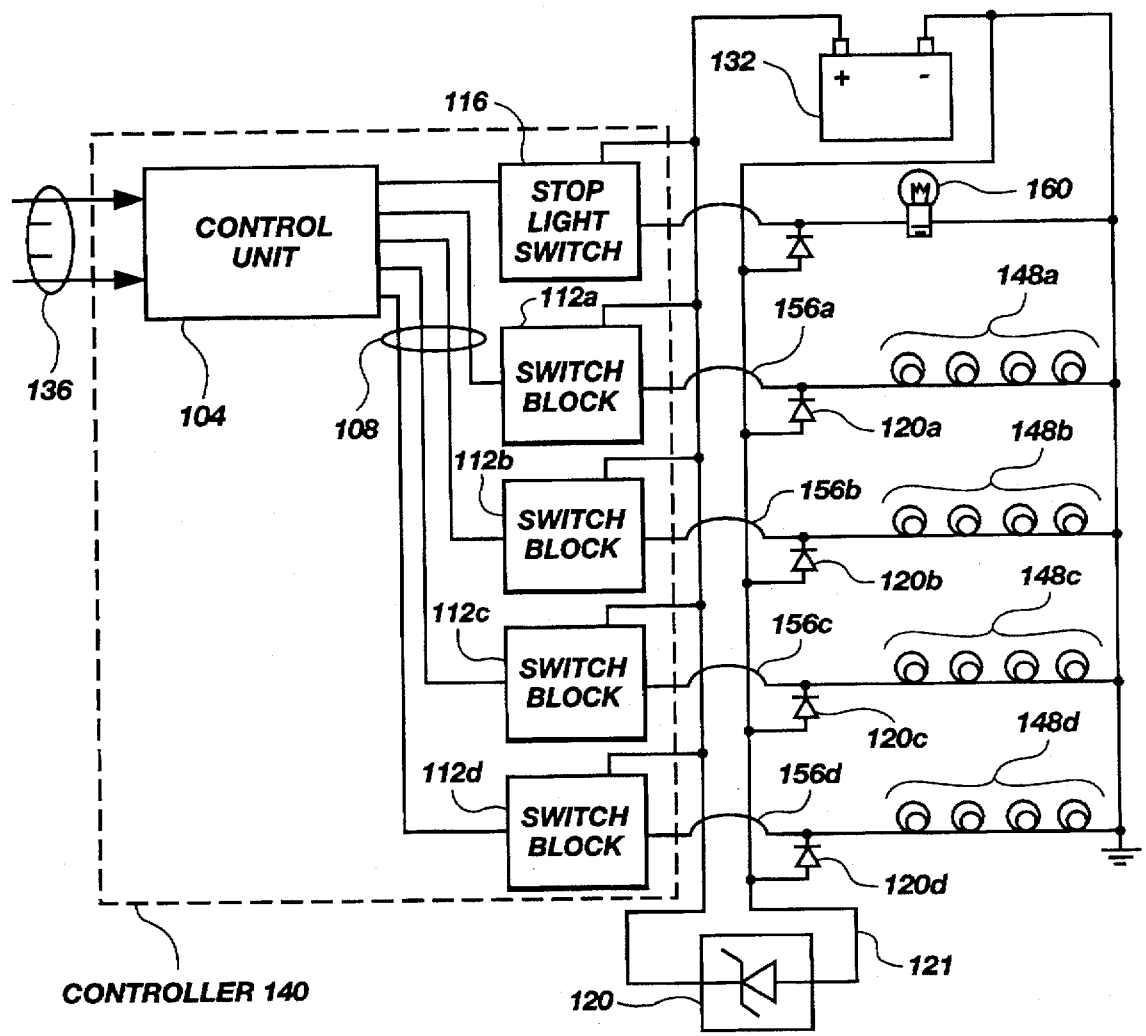
FIG. 2 is a schematic of one illustrative embodiment of control apparatus for controlling current flow to four coil groups of an electromagnetic retarder.

FIG. 2 shows a schematic diagram of the controller 140 of FIG. 1 for controlling current supplied to four groups of electromagnetic retarder coils 148a, 148b, 148c and 148d, each coil group illustratively showing four coils. The controller 140 includes a control unit 104, preferably solid state as will be discussed hereafter, for receiving command signals over lines 136 from either the hand control 116 or foot control 118 (FIG. 1). These command signals indicate the level of braking force to be generated by the controller 140 and, for the embodiment shown in FIG. 2, the development of five braking force levels will be discussed initially.

The control unit 104 receives the command signals and then, depending upon the braking force to be developed, supplies drive signals via drive lines 108 to switch blocks 112a, 112b, 112c and 112d. The switch blocks 112a through 112d, advantageously, are solid state switches which allow for rapid turn on and turn off, i.e., opening and closing, to allow current to flow from the current source 132 via the activated switch blocks to respective coils 148a, 148b, 148c or 148d. Application of current to the coil groups result in development of the desired magnetic fields which interact with rotors, inducing a torque in the rotors in a direction opposite to their rotation and this, of course, serves as a braking force to the vehicle. For example, when the control unit 104 supplies the drive signal to switch block 112a, for example in the form of a high voltage signal, switch block 112a is activated or turned on to conduct current from the battery 132 to the coil group 148a. Advantageously, the switch blocks 112a through 112d might incorporate MOSFET circuitry, IGBT circuitry, or solid state relays, as will be discussed later.

The control unit 104 also controls the turn on of stop light 160 via a stop light switch 116 by simply allowing current to flow via the switch 116 to the stop light 160.

When a switch block is turned off by the control unit 104, for example by a low voltage signal, it ceases to conduct current from the battery 132 to a corresponding coil group but the coil group continues to draw current for a short period through a corresponding one of diodes 120a, 120b, 120c and 120d. Such current is drawn through the local ground wire 121.

A voltage transient absorber 120 is coupled between the positive and ground terminals of the battery 132 to absorb voltage spikes generated when the switch blocks are instantaneously turned off (the momentum of the current from the battery due to the inherent inductance of the feed line 144 can cause high voltage spikes on the line 144). The transient voltage suppressor 120 in the embodiment of FIG. 2 is shown as a zener diode. As will be further discussed in connection with FIGS. 3A–3C, the controller 140 of the present invention operates to distribute current substantially evenly among the coil groups 148a through 148d, and operates to draw substantially a constant current from the battery 132 by turning on one switch block as another switch block is turned off. Because of this, very few high voltage spikes occur and a fairly simple solid state voltage transient absorber 120 can be utilized. In the prior art, a large, heavy, expensive and unreliable capacitor arrangement was required.

Figure 3A:
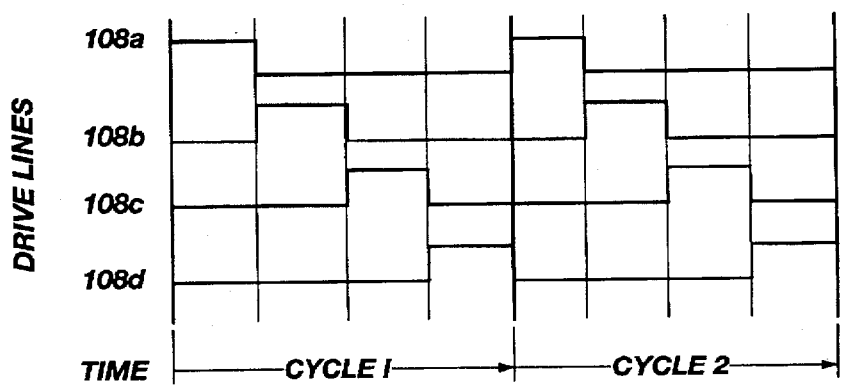
FIGS. 3A, 3B and 3C are graphic representations of three illustrative sets of phase-shifted drive signals developed by the control unit of FIG. 2 for controlling the flow of current to the coil groups.

Referring now to FIG. 3A, there is shown a graphic representation of drive signals developed by the control unit 104 and supplied to switch blocks 112a through 112d on which the drive signals are phased in relation to one another such that the number of switch blocks activated at any instance is substantially constant and therefore the current being drawn from the battery is substantially constant. In the FIG. 3A set of drive signals, drive line 108a to switch block 112a is turned on for one fourth of a cycle, at the beginning of cycle 1 and the beginning of cycle 2. As soon as switch block 112a is turned off, then the drive signal to switch block 112b turns that switch block on for one fourth of a cycle, etc. so that each switch block is turned on one fourth of the time during each cycle and only when no other switch blocks are turned on. In this manner, the coil groups are all used equally so that no one or two coil groups bear any heavier burden for producing a retarding force than any other coil groups. Note that each drive signal is shifted one fourth of a cycle from the previous drive signal and that only one switch block is activated at any time although the current from the battery to the coil groups is substantially constant. Basically, with the drive signal set of FIG. 3A, one-fourth of the maximum current to the coil groups is delivered so that one-fourth maximum current is provided to each coil group (where the maximum current is the steady current that would flow through a coil group if were continually connected to the current source ).

Figure 3B:
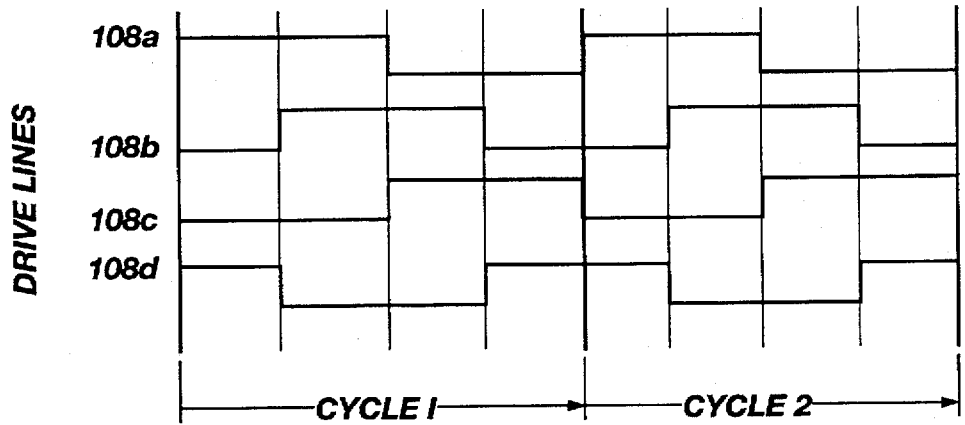

FIG. 3B shows another set of drive-signals for providing one-half of the maximum current to the coil groups. Here, the drive signal on drive line 108a turns on switch block 112a for the first half of each cycle and turns it off for the last half of each cycle. The drive signal on drive line 108b turns on switch block 112b at the one quarter cycle time in each cycle and turns it off after three quarters time in each cycle. The drive signal on drive line 108c turns on switch block 112c at the half point in time in each cycle and turns it off at the beginning of the succeeding cycle. Finally, the drive signal on drive line 108d turns on the switch block 112d for the first one-fourth cycle of each cycle and the last one-fourth cycle of each cycle, as shown. Notice that at any instant of time, two switch blocks are turned on and two are turned off but that again, current is distributed to the coil groups substantially equally.

Figure 3C:
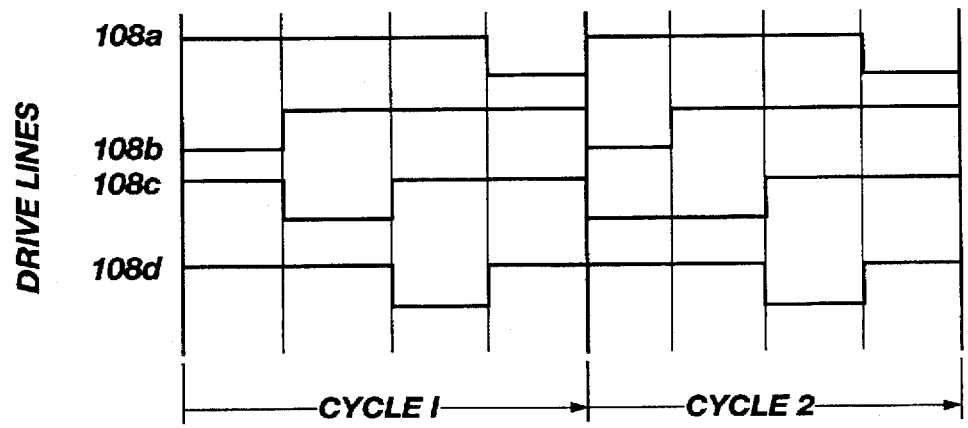

FIG. 3C shows exemplary drive signals over two cycles for delivering three-fourths of the maximum current to the coil groups. Here, at any instant of time, three of the switch blocks are turned on and one is turned off.

The final drive signal set is simply when all four switch blocks are activated the entire time during each cycle (all four drive signals high) so that full braking power would be developed. A fifth drive signal set is trivial in that it would involve no switch blocks being turned on (all drive signals low) so that no braking power would be developed. In effect, five levels of braking control can be developed, with one of those five levels simply being no braking control.

As shown, the present invention provides a control for retarder coils that may provide numerous, small, incremental changes in force applied by the coils; allowing for gradual increases and decreases of retarder braking force, allowing for even and efficient application of the braking force.

It may be desirable to have even more levels of control than those discussed above in connection with FIGS. 3A–3C and have them more closely spaced so that any change in braking force is made through smaller increments. This can be achieved with the system shown in FIGS. 1 and 2 by mixing or "scheduling" the five sets of drive signal patterns. That is, if the drive signals are mixed as to duration in time, then besides the levels of control including "off", one-fourth, one-half, three-fourths and "full", additional levels of control can also be achieved. (An important restriction is that the duration of the number of cycles over which the mixing occurs is small compared to the time constant of the corresponding coil groups being controlled). For example, if it were desired to obtain a one-eighth maximum current, then mixing the one-fourth control level shown in FIG. 3A with the "off" level over two cycles, the one-eighth control level may be obtained. Specifically, the same command signal pattern as shown for cycle 1 in FIG. 3A would be provided to the switch blocks 112a through 112d but then for the cycle 2, all command lines would be in the low voltage or "off" condition. Thus, for every two cycles, each command line would only be on or carrying a high voltage drive signal for one-eighth of the time during that two cycle period.

As another example, assume that for cycle 1, the command lines are energized again in the pattern shown for cycle 1 of FIG. 3A, but then for cycle 2, command lines 108a and 108c are energized for the first half of cycle 2 and then de-energized for the last half, whereas command lines 108b and 108d are de-energized for first half of cycle 2 and then energized for the last half of cycle 2. In this manner, each command line would be energized for three-eighths of the time over every two cycle period, i.e., one-fourth of the time during cycle 1 and one-half of the time in cycle 2, for a total of three-eighths of the time over the two cycles. Thus, three-eighths of maximum current would be supplied to the coil groups. Similarly, by mixing the five basic command signal patterns discussed above over two cycles, a five-eighths and seven-eighths control level can also be achieved. This would yield a total of nine braking force levels-0, 1/8, 1/4, 3/8, etc.

By mixing the five command signal patterns discussed above over four cycles rather than two cycles, it is possible to obtain seventeen control levels including 1/16, 1/8, 3/16, 1/4, etc. and also including the totally "off" level.

For the above-described mixing to work, the duration of the number of cycles over which the patterns are mixed must be small compared to the time constant of a coil group being controlled. Typically, the duration of the number of cycles of mixing will be one-hundredth or smaller than the time constant of the coil group. It will be apparent that with the type of mixing of command signal patterns discussed above, one coil group or groups may not turn on just as another coil group or groups turn off. However, for at least some of the cycles the advantage of turn off of one coil group when another is turned on is still achieved, for the benefits described above.

It is also apparent that the concepts of using and mixing basic signal patterns to maintain essentially constant flow of current from a current source can be generalized to apply to retarders with any number n of coil groups. For n coil groups there will be n+1 basic signal patterns and a corresponding n+1 basic levels of maximum current, which are 0, 1/n . . . . . n/n times maximum current.

Once again, the 0 level (full off) is obtained by the trivial signal pattern where all drive signals are low, and the n/n level (full on) is obtained by the trivial signal pattern where all drive signals are high. The 1/n level is obtained by a signal pattern where each of the n drive signals is high for 1/n of a cycle and the drive signals are phased relative to each other so that as one drive signal goes low, another goes high. The i/n level, where i is an integer between 1 and n, is obtained by a signal pattern where each of the n drive signals is high for i/n of a cycle and the drive signals are phased relative to each other so that as one drive signal goes low, another goes high. Of course, these n+1 basic signal patterns can be mixed to obtain many intermediate levels of maximum current.

As will be appreciated, in addition to the hand and foot controls 116 and 118 (FIG. 1), the input braking device could also be a number of other devices such as an anti-lock-brake system (ABS) or a low-speed cut-off (LSC). In an ABS, when an impending wheel lock-up is detected, the ABS releases or holds the brake pressure on the brakes. An ABS signal could also be used by the retarder controller either to trigger the termination of any current being supplied to the retarder or to provide preselected drive signal patterns.

In an LSC system, an LSC signal is developed to indicate that a vehicle has slowed sufficiently that further assistance from a retarder is unnecessary. If LSC signals were provided to the controller 140 (FIG. 1), the controller would stop current from the current source from flowing through the retarder coils. Therefore, the current would be cut off even though a vehicle driver may forget to return the hand control to the off position, or maintains his foot on the foot control while the vehicle is stopped or slowed to a predetermined speed.

Figure 4:
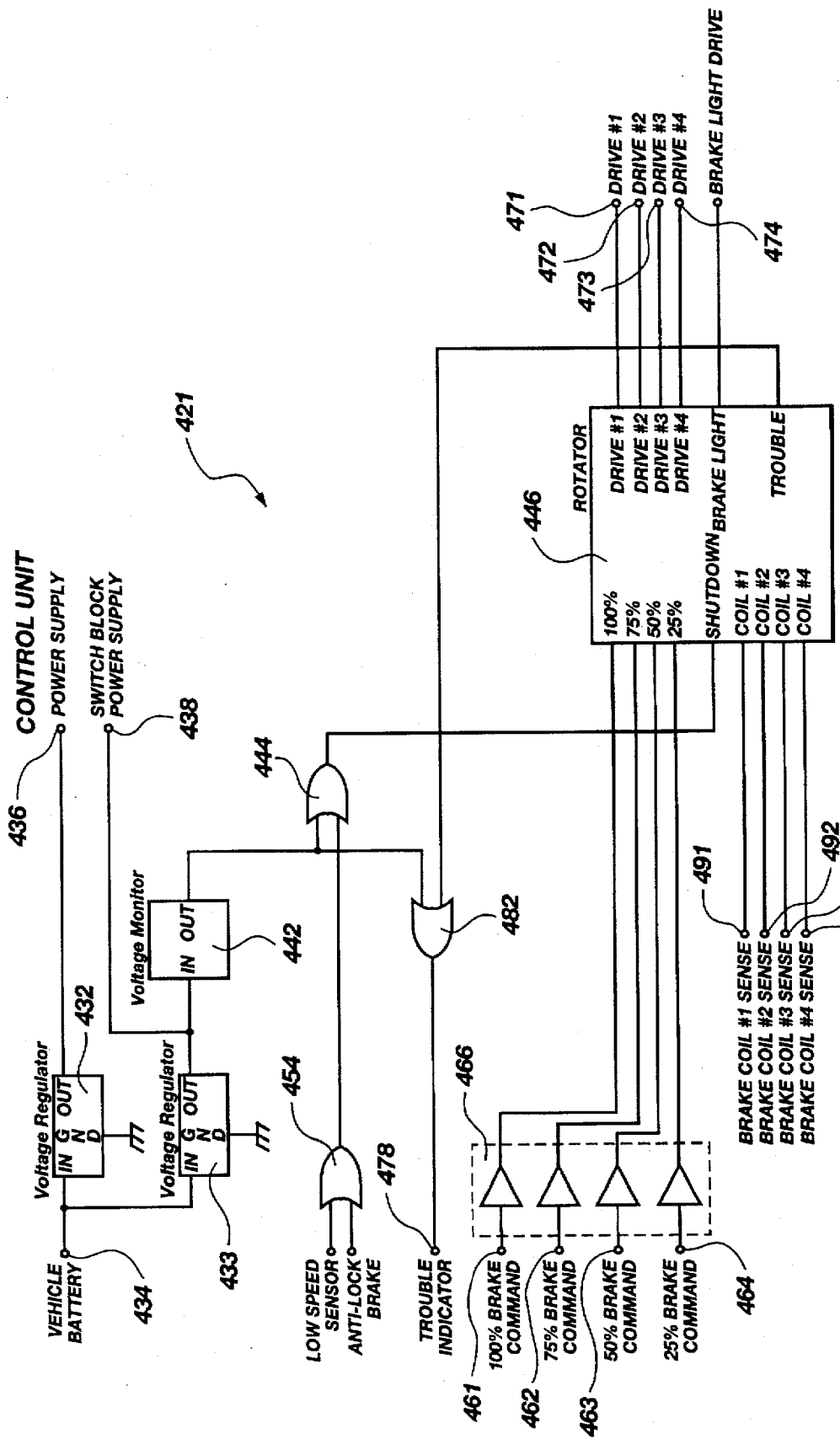
FIG. 4 is a more detailed schematic diagram of the control unit of FIG. 2.

FIG. 4 is an illustrative circuit diagram of the control unit 104 of FIG. 2, which includes two voltage regulators 432 and 433 which draw power from the vehicle battery and provide a stable voltage and power source for the other control unit circuitry and switch blocks 112a through 112d of FIG. 2. Power from the voltage regulator 433 is also supplied to and monitored by a voltage monitor circuit 442, and then supplied to OR gate 444 and to a rotator block 446.

In addition to the power signal from the voltage monitor circuit 442, the OR gate 444 receives a signal from either a LSC or an ABS system, via an OR gate 454.

The output signal from the OR gate 444 will either be the power signal from the voltage monitor 442 or a signal from the LSC or ABS systems, and will be supplied to a shutdown input terminal of the rotator block 446, to turn off any drive signals being developed by the rotator.

Command signals from the hand control 116 or foot control 118 (FIG. 1) are received through four brake command lines at the brake command terminals 461, 462, 463, and 464. These command signals are converted to digital signals by a buffer block 466, shown in phantom line, and then supplied to the rotator block 446.

The rotator block 446 supplies drive signals to the switch blocks shown in FIG. 2 through the switch block terminals 471, 472, 473, and 474. If, however, a signal is supplied through the OR gate 444 to the shutdown terminal, all of the drive signals to the switch block terminals 471–474 will be turned off, regardless of the status of the command signals on the command terminals 461–464.

If any drive lines are carrying drive signals, the rotator block 446 will send a signal to brake light terminal 476 for activating the brake lights.

The rotator block 446 periodically and rapidly alternates the drive signals sent to the switch block terminals 471–474. This alternation (or rotation) keeps the same number of drive lines on, but the specific drive lines which are on constantly changes.

This rotation allows all of the retarder coil groups to be used equally, and also permits the advantageous phasing of the drive signals so that as one drive line is turned off, another is turned on, as previously discussed, almost instantaneously and with minimal disruption in the current being delivered from the battery 434. The equal utilization of all of the retarder coil groups improves the working life of retarders and equally distributes work, wear and heating.

An additional function the rotator block 446 may perform is to compare the drive signal of each coil group with the actual coil group voltage. If a drive signal, for example, is high, then its corresponding coil group voltage should also be high and if the drive signal voltage is low, then the corresponding coil group voltage should be zero. If these conditions are not satisfied for each drive signal and corresponding coil group voltage, an open or shorted switch block or coil group may be indicated, and the rotator block 446 would supply a signal to the "trouble" terminal. This "trouble" signal is supplied to OR gate 482 and its output signal to "trouble" terminal 478 for use in turning on an indicator and alerting the vehicle driver to possible problems with the retarder or controller. The rotator block 446 might illustratively be Programmable Array Logic such as Advanced Micro Devices' PAL22CE10.

Figure 5:
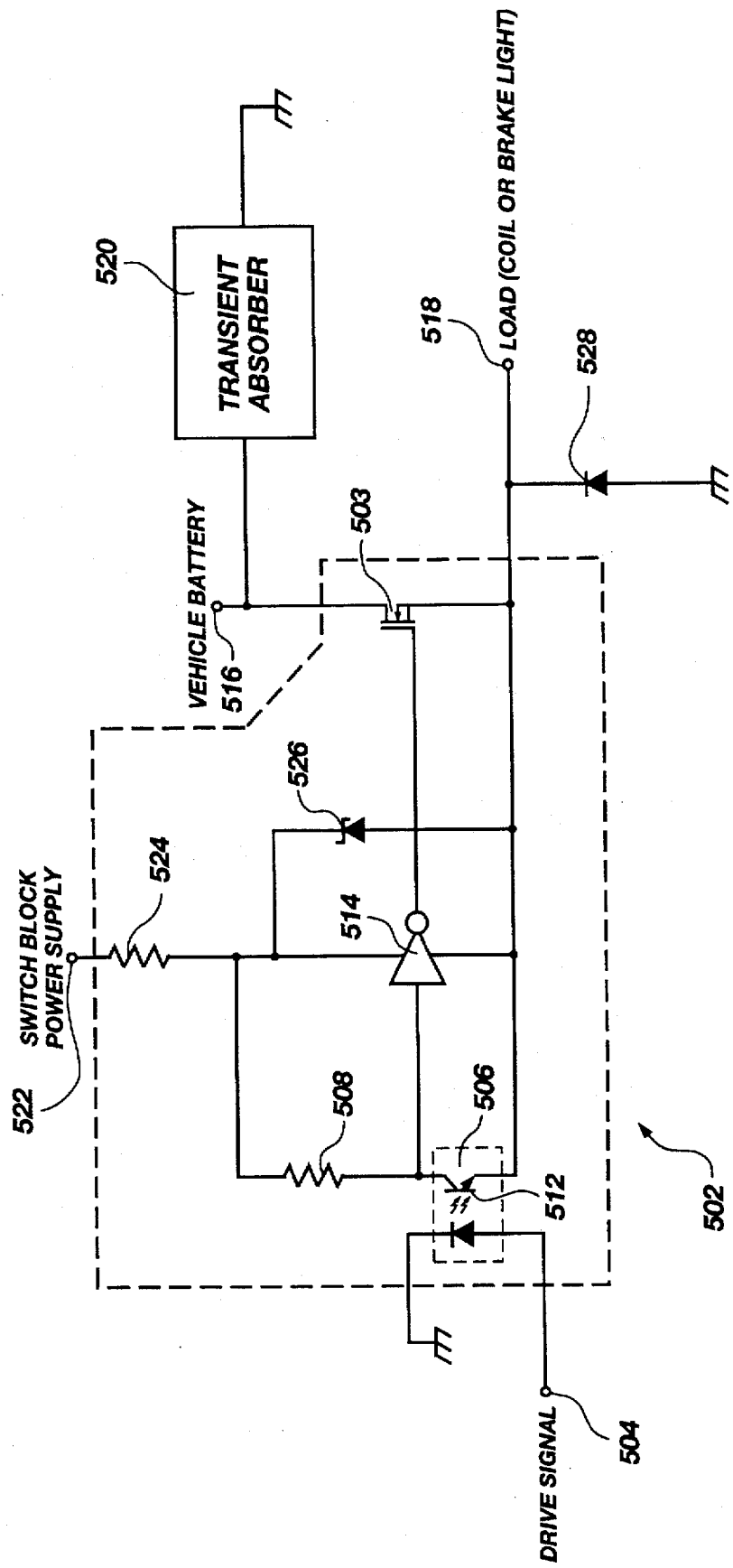
FIG. 5 is a schematic diagram of a switch block which might be utilized for the switch blocks shown in FIG. 2.

FIG. 5 shows a circuit diagram representing one of the five switch blocks shown in FIG. 2. In particular, switch block 502 in FIG. 5 is an illustrative embodiment of circuitry for a solid state switch, which includes a drive signal terminal 504 for receiving a drive signal from the control unit 104 of FIG. 2. The drive signal is routed to an optical isolator 506, which electronically isolates the drive signal from the high current switching circuitry. The presence of a high logic level drive signal causes the transistor 512 in the optical isolator to conduct, turning off the input signal to a MOSFET Driver 514 which then turns on a MOSFET 503, allowing current to flow from a vehicle battery terminal 516 to a load terminal 518. In this manner, current from the battery is supplied to either a corresponding coil group or brake lights. A transient voltage absorber 520 absorbs voltage spikes that occur when the current supply to the vehicle battery terminal 516 is suddenly interrupted.

When the drive signal is at a low logic level, the transistor 512 in the optical isolator 506 stops conducting, turning on the input to the MOSFET Driver 514, which then turns off the MOSFET 503.

The supply voltage to the MOSFET Driver 514 is kept substantially constant by a zener diode 526, and the freewheeling diode 528 limits the back electromotive force (EMF) of the load when the MOSFET 503 is turned off and sustains current flow through the corresponding coil group.

Figure 6:
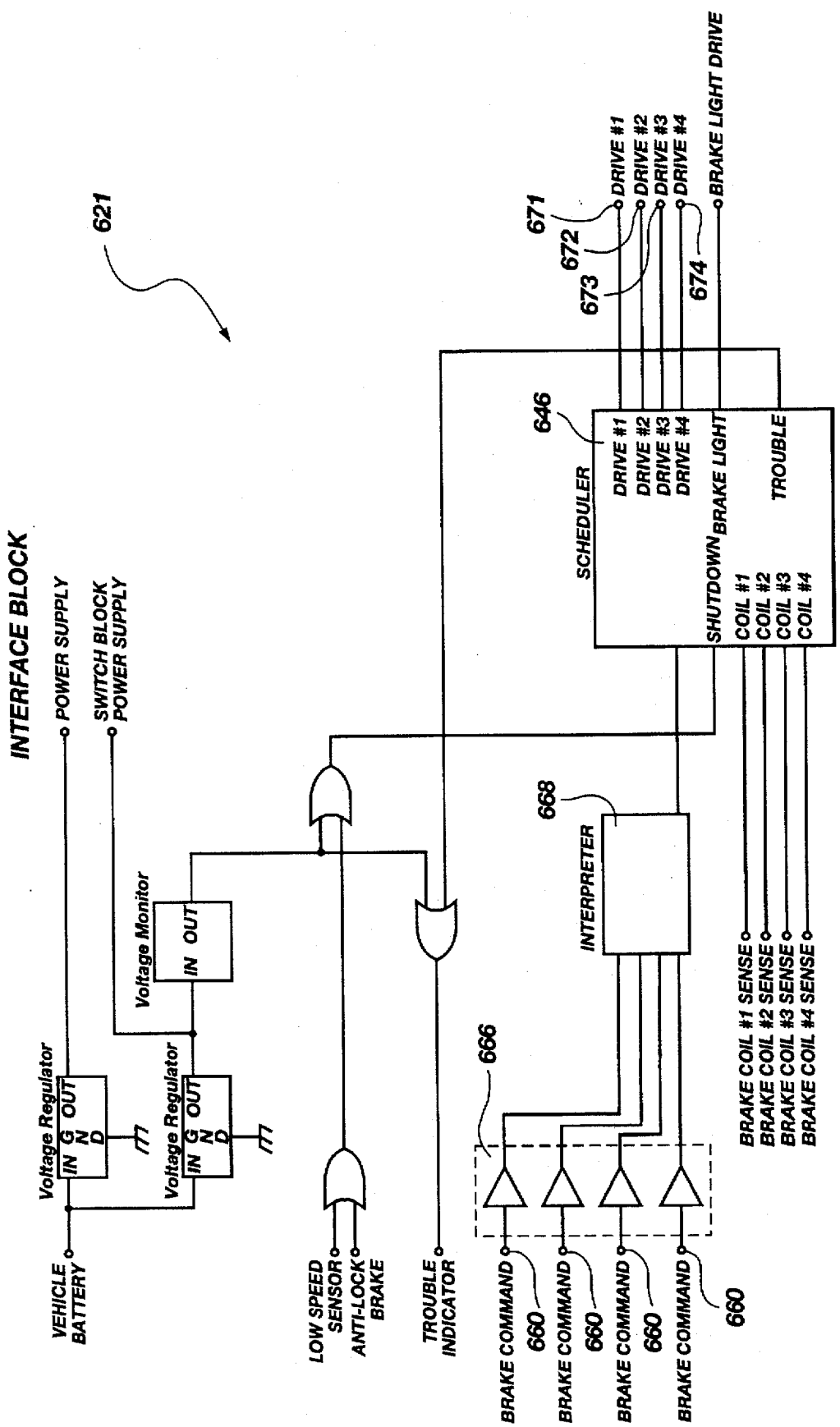
FIG. 6 is a schematic diagram of an alternative embodiment of electromagnetic retarder control unit made in accordance with the principles of the present invention.

FIG. 6 shows a circuit diagram of an alternative embodiment of the control unit 104 of FIG. 2, generally indicated at 621. This embodiment permits mixing of drive signal patterns as previously discussed. It will be appreciated that the circuitry with respect to the control units 421 and 621 of FIG. 4 and FIG. 6 respectively, are similar, with the most significant differences being that the embodiment shown in FIG. 6 includes a pattern scheduler block 646 and a command interpreter block 668.

Command signals are received through command terminals 660 and are buffered by the buffer block 666. The buffered signals are supplied to the command interpreter block 668 which supplies a command pattern signal to the pattern scheduler block 646. The scheduler block 646 selects from among the five patterns discussed above and mixes those patterns to achieve the desired control levels, e.g., ⅛ force, ¼, ⅜, etc. to produce the appropriate retardation force.

The scheduler block 646 supplies drive signals to switch blocks through the switch block terminals 671, 672, 673, and 674. Thus, the interpreter block 668 in conjunction with scheduler block 646 are able to provide the appropriate drive signal patterns to cause the retarder coil groups to produce the desired retardation forces. The interpreter block 668 and the scheduler block 646 could illustratively be Programmable Array Logic circuits as discussed earlier.

Figure 7:
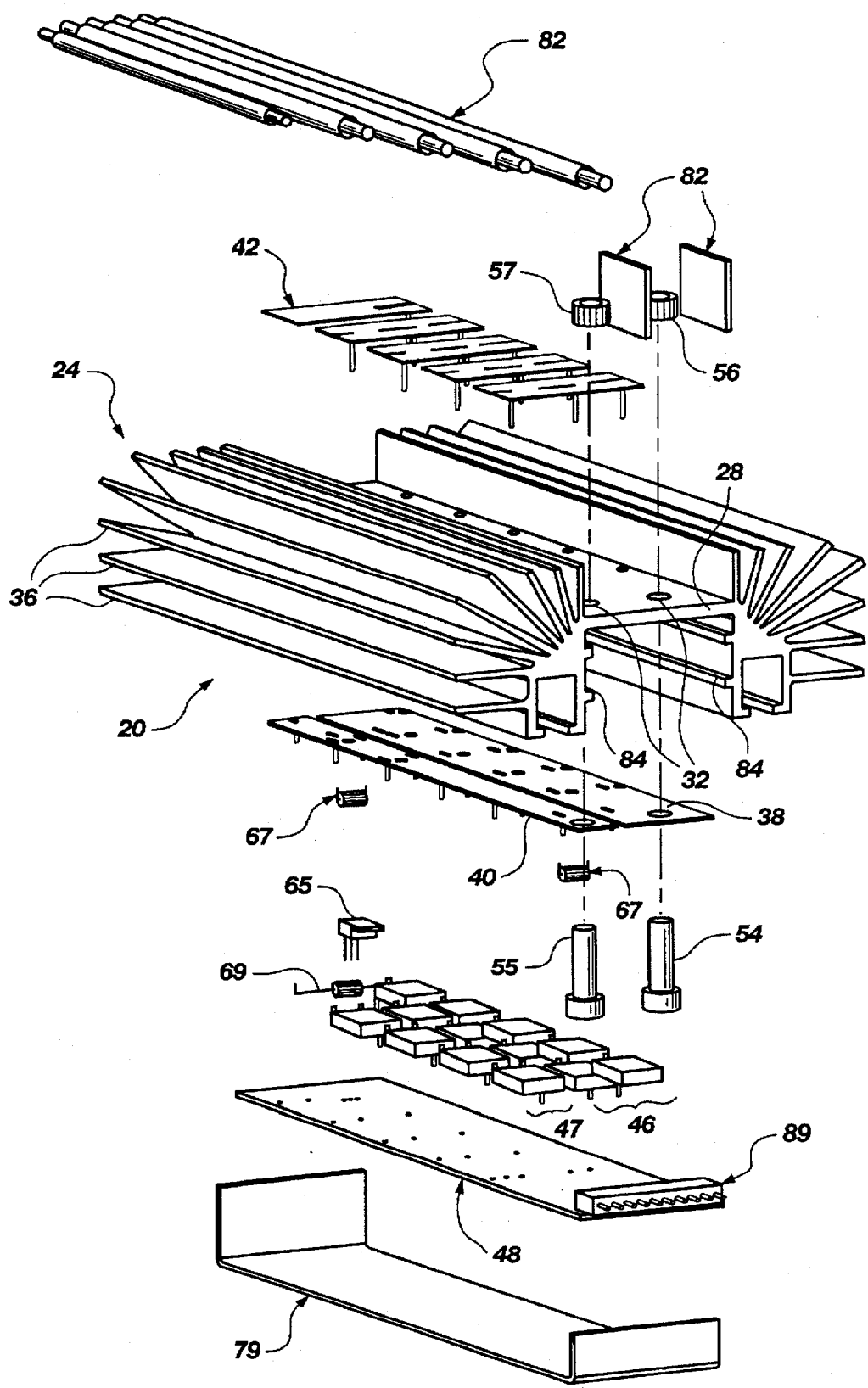
FIG. 7 is an exploded view of electromagnetic retarder control apparatus housing made in accordance with the principles of the present invention.

FIG. 7 is an exploded view of an illustrative embodiment of a housing 20 for the retarder control apparatus of the present invention. The housing serves both to contain the various components of the controller and act as a heat sink to disperse heat developed during operation of the controller.

The housing 20 includes a heat sink 24 made, for example of an aluminum extrusion having a generally planar central wall 28, with apertures 32 for facilitating mechanical connections and passageways for electrical connections. Formed on either side of the central wall 28 are a plurality of flared fins which serve to radiate heat developed by the electrical components in the controller.

Attached to the bottom of the central wall 28 are a positive power strip 38 and a negative power strip 40, and output strips 42 are attached to the upper surface of the central wall. An output strip is provided for each of the coil groups described earlier and one for the stop light.

Held or connected to the positive power strip 38 is an array of MOSFETS 46, formed generally as flat packages and each having three leads, a source lead, a drain lead and a gate lead. Each source lead is connected to an output strip 42. Each drain lead is connected to the positive power strip 38 and each gate lead is connected to a circuit board 48.

Attached or held to the negative power strip 40 is an array of diodes 47. Each diode has two leads, a cathode lead and an anode lead, with the cathode lead being connected to an output strip 42 and the anode lead being connected to the negative power strip 40.

A positive post 54 is electrically connected to the positive power strip 38, routed through the heat sink, and secured by an anchor 56. A negative post 55 is electrically connected to the negative power strip 40, routed through the heat sink, and secured by an anchor 57.

A voltage regulator 65 is attached to the positive power strip 38 and one or more transient voltage absorbers 67 are electrically connected on one end to the power positive strip 38 and on the other end to the negative power strip 40. A diode 69 has its anode lead electrically connected to the negative power strip 40 and its cathode lead electrically connected to the output strip for supplying current to the stop lights monetarily upon abrupt opening of stop light switch 160 (FIGS. 1 and 2).

Cables or conductors 82 extend from the output strips 42 to respective coil groups of the retarder or to the stop lights of the vehicle. The upper surface of the central wall 28 may be filled with epoxy to hold the wires and anchors in place and to seal the top of the housing.

The circuit board 48 is mounted on shelves 84 formed in the heat sink below the central wall 28. Of course, the circuit board 48 is provided with holes to accept gate leads and source leads from the MOSFETS and the leads of the voltage regulator 65. A cover 79 is attached to the bottom of the heat sink 24.

All of the components discussed above were described functionally in connection with the other drawings and are discussed and identified in connection with FIG. 7 simply to show an illustrative way of mounting and holding the components in place relative to the heat sink 24. Of course, a variety of other methods may be employed to hold the components in place in a housing.

While the present invention is described in terms of an electromagnetic retarder control for a vehicle, it is to be understood that the subject apparatus and method may be used in any electromagnetic retarder control application. Those having ordinary skill in the field of this invention will appreciate the advantages of the invention, and its application to a wide variety of control uses.

It is to be understood that the above-described arrangements are only illustrative of the application of the principles of the invention. Numerous modifications and alternative arrangements may be devised by those skilled in the art without departing from the spirit and scope of the present invention and the appended claims are intended to cover such modifications and arrangements.

What is claimed is:

1. A controller for controlling supply of electrical current from a current source to a plurality of coil means of an electromagnetic retarder, said controller comprising
    a plurality of switch means, each coupled between the current source and a respective one of the coil means, for passing current thereto when energized and for blocking the passage of current to the respective coil means when de-energized,
    control means for selectively energizing and de-energizing each switch means so that one switch means is de-energized about the same time as another switch means is energized, and
    means for maintaining the flow of current to a coil means for a short time following de-energization of the respective switch means.

2. A controller as in claim 1 wherein said control means includes means for energizing and de-energizing each switch means to allow substantially the same amount of current to flow to each coil means.

3. A controller as in claim 1 wherein said control means further includes means to energize and de-energize the switch means so that the number of coil means receiving current from the current source at any instant of time remains substantially constant.

4. A controller as in claim 1 further including a transient voltage absorber means for suppressing voltage spikes developed when de-energizing the switch means.

5. A controller as in claim 1 wherein said control means comprises
    means for developing command signals indicative of the amount of current to be supplied to the coil means, and
    means responsive to the command signals for developing drive signals to energize and de-energize the switch means to pass an amount of current indicated by the command signals.

6. A controller as in claim 5 for controlling supply of electrical current to a stop light wherein said controller further includes a stop light switch means coupled between the current source and the stop light, and wherein the control means further comprises means responsive to the command signals for developing a drive signal to energize and de-energize the stop light switch means to respectively pass or prevent flow of current from the current source to the stop light.

7. A controller as in claim 1 further including heat sink means in which the control means and switch means are disposed, for dissipating heat developed by the control means and switch means.

8. A controller as in claim 7 wherein said heat sink comprises a central wall having opposing edges, a plurality of fins extending from each opposing edge, and shelve means formed with and spaced apart from the central wall, and wherein said control means includes a circuit board disposed on the shelve means.

9. A controller as in claim 1 for use in combination with an anti-lock-brake system of a vehicle which develops an ABS signal when an impending wheel lock-up of the vehicle is detected, said controller further comprising means responsive to the ABS signal for preventing current flow to at least one of the coil means.

10. A controller as in claim 1 for use in combination with a low-speed cut-off system of a vehicle which develops an LSC signal when a reduction in speed of the vehicle is detected, said controller further comprising means responsive to the LSC signal for preventing current flow to at least one of the coil means.

11. A controller as in claim 1 wherein said current flow maintaining means comprise diodes coupled between ground potential and respective coil means.

12. A controller as in claim 1 wherein said control means comprises means for generating cycles of drive signal for energizing the switch means to pass current and for de-energizing the switch means to stop the flow of current from the current source, such that substantially the same amount of current flows to each coil means during a cycle.

13. A controller as in claim 12 wherein said means for generating cycles of drive signal comprises means for selectively developing cycles of drive signals to energize and de-energize the switch means to vary the amount of current from the current source which flows to each coil means from one cycle to another, while maintaining substantially the same current flow to each coil means during any one cycle.

14. A controller as in claim 1 wherein said switch means comprise MOSFETS.

15. A controller as in claim 1 wherein said control means comprises a programmable array logic circuit.

16. A controller for controlling the supply of electrical current from a current source to a plurality of electromagnetic retarder coils of a vehicle braking system, said controller comprising:

input means for developing command signals for indicating desired braking forces, means responsive to the command signals for modulating electrical current from the current source for supply to the retarder coils to produce braking forces indicated by the command signals, means for supplying the modulated electrical current to the retarder coils so that each retarder coil receives substantially the same current as each of the other coils, and heat sink means in which the means responsive to the command signals and the means for supplying the modulated electrical current are disposed, for dissipating heat developed therein.

17. The controller as in claim 16, wherein the means for supplying the modulated electrical current includes means for modulating electrical current to cycle between first and second current levels so that as current from the current source to at least some of the coils is changed from the first level to the second level, current from the current source to at least some of the other coils is changed from the second level to the first level.

18. The controller as in claim 17, wherein the means for supplying the modulated electrical current includes means for modulating electrical current from the current source so that the number of retarder coils receiving current from the current source at any instant of time remain substantially constant.

19. A controller for controlling the supply of electrical current from a current source to a plurality of groups of electromagnetic retarder coils of a vehicle braking system which develops an anti-lock-brake system (ABS) signal when an impending wheel lock-up of the vehicle is detected, said controller comprising:

input signal receiving means for receiving input signals from an input device, said input signals being indicative of the retardation forces to be developed by said groups of retarder coils;

control means responsive to the input signals for developing a plurality of drive signals, each of which cycles between an activation level and a deactivation level, the activation level of some drive signals being phase-shifted from the activation level of other drive signals, so that as one or more drive signals cycles from the activation level to the deactivation level, one or more other drive signals cycles from the deactivation level to the activation level, a plurality of switch means, each responsive to a respective drive signal for supplying electrical current from the current source to a respective retarder coil group during the activation level of the respective drive signal, and means responsive to the ABS signal for preventing current flow to at least one of the retarder coil groups.

20. A controller as in claim 19 wherein said control means comprises means for periodically varying from cycle to cycle the time during which the drive signals are at the activation level, such that for any one period, each drive signal is at the activation level for substantially the same time as each of the other drive signals.

21. A controller as in claim 20 wherein said switch means comprise MOSFETS.

* * * * *